July 4, 1944.   B. S. GARVEY ET AL   2,352,705
COMPOSITE ARTICLE
Filed Oct. 7, 1939
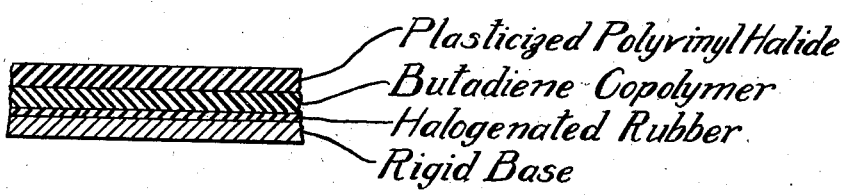
Plasticized Polyvinyl Halide
Butadiene Copolymer
Halogenated Rubber
Rigid Base
Inventors
Benjamin S. Garvey
Donald E. Henderson
By Willis J. Avery
Atty Patented July 4, 1944

2,352,705

UNITED STATES PATENT OFFICE 2,352,705

COMPOSITE ARTICLE

Benjamin S. Garvey and Donald E. Henderson, Akron, Ohio, assignors to The B. F. Goodrich Company, New York, N. Y., a corporation of New York Application October 7, 1939, Serial No. 298,472

7 Claims. (Cl. 154—2)

This invention relates to composite articles in which a plasticized polyvinyl halide is adhered to a rigid base by means of halogenated rubber.

Although polyvinyl halides do not in general adhere to other materials, it is known that strong bonds between polyvinyl halides and rigid bases such as metal, wood, stone, etc., are obtainable by the use of halogenated rubber cements. To obtain increased flexibility, it is generally desirable to add a plasticizer to the polyvinyl halide. The gamma polymer of vinyl chloride is particularly useful when plasticized, for it forms resilient, rubber-like compositions as disclosed in U. S. Patent No. 1,929,453 issued to Waldo L. Semon. It has been found, however, that in composite articles of the type described, the plasticizer has a tendency to bleed into the halogenated rubber, thereby weakening and eventually destroying the adhesion.

It is the principal object of this invention to provide a permanent adhesive bond between a plasticized polyvinyl halide and a base.

We have discovered that if a layer of a vulcanizable composition comprising a copolymer of butadiene and an unsaturated nitrile having the structural formula

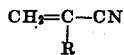

wherein R represents a member of the class consisting of hydrogen and alkyl groups is interposed between the plasticized polyvinyl halide and the layer of halogenated rubber contiguous to the base, a permanent adhesive bond is obtained. Typical examples of unsaturated nitriles which may be copolymerized with butadiene include acrylic nitrile, alpha-methacrylic nitrile, alpha-ethacrylic nitrile, alpha-isopropylacrylic nitrile, etc.

In order that the invention may be better understood, reference is made to the accompanying drawing in which the sole figure shows a section of an article made by the method of this invention, said article consisting of successive layers of a rigid base such as aluminum, halogenated rubber such as chlorinated rubber containing approximately 65% of chlorine, a butadiene copolymer such as a copolymer of 75 parts of butadiene with 25 parts of acrylic nitrile, and a layer of a plasticized polyvinyl halide such as plasticized gamma polyvinyl chloride. The relative thicknesses of the different layers in the drawing are not intended to represent the actual thicknesses which will be employed in constructing the article, for the drawing is designed to illustrate merely the relative positions of the different materials.

In the practice of this invention, the base is covered with one or more coats of halogenated rubber cement, the highly chlorinated rubber containing in the neigrborhood of 65% of chlo- rine being a preferred material. A layer of a copolymer of butadiene and acrylic nitrile compounded so that it will be vulcanized when the composite product is heated is next applied either in the form of a thin sheet or a cement. Copolymers of from 90–60 parts of butadiene and 10–40 parts of unsaturated nitrile are preferred, though copolymers of different composition may be employed if desired. The compounding and vulcanization of the copolymers is well understood by those skilled in the art and forms no part of this invention. The methods employed however, are in general the same methods employed in preparing vulcanized rubber. The plasticized polyvinyl halide such as the alpha, beta, or gamma polymer of vinyl chloride, polyvinyl bromide, or a polyvinyl halide formed by copolymerizing vinyl chloride with a minor proportion of a vinyl organic ester such as vinyl acetate is then applied to the copolymer, and the assemblage is heated under pressure until the copolymer interlayer is vulcanized.

Although satisfactory adhesion is ordinarily obtained by merely placing the layer of plasticized polyvinyl halide on the copolymer prior to vulcanization, further treatments may be found desirable when the best attainable adhesion is desired. The surface of the copolymer may be rendered tacky by treatment with a solvent such as an aromatic hydrocarbon, a halogenated aromatic hydrocarbon or a volatile ester prior to the application of the plasticized polyvinyl halide. The adhesion is also increased by including a layer of halogenated rubber between the plasticized polyvinyl halide and the copolymer.

Employing the method of this invention, a permanent bond was formed between plasticized, gamma polyvinyl chloride and aluminum. The following compositions were prepared:

*Halogenated rubber cement*

| | Parts by weight |
|---|---|
| Tornesit [1] | 378.5 |
| Tetralin | 37.9 |
| Benzene | 3330.0 |

[1] A commercially-available product believed to be chlorinated rubber containing approximately 65% of chlorine.

*Vulcanizable copolymer*

| | Parts by weight |
|---|---|
| Perbunan [2] | 100 |
| Zinc oxide | 5 |
| Gas black | 80 |
| Coumarone resin | 10 |
| Dibutyl phthalate | 30 |
| Sulfur | 2 |
| Accelerator | 2 |

[2] A commercially-available product believed to be a copolymer of approximately 75 parts of butadiene and 25 parts of acrylic nitrile.

Plasticized polyvinyl halide

| | Parts by weight |
|---|---|
| Gamma polyvinyl chloride | 60.3 |
| Dibutyl phthalate | 37.7 |
| Lead silicate (stabilizer) | 2.0 |

Tackifier

| | Parts by weight |
|---|---|
| Dibenzyl ether | 30 |
| Methyl ethyl ketone | 70 |

Steel blasted aluminum and a sheet of the plasticized gamma polyvinyl chloride were coated with a layer of the chlorinated rubber cement and allowed to dry. The coated surfaces were then joined by a thin sheet of the vulcanizable copolymer composition about 0.030″ thick which had been brushed on both sides with the tackifier. The composite structure was heated under pressure for 30 min. at 307° F. to vulcanize the copolymer. In the resulting article, the adhesion between the plasticized gamma polyvinyl chloride and the metal was excellent, and the bond did not weaken as the article aged.

It will be noted that some plasticizer was included, following standard practice, in the copolymer but that no weakening of the bond due to bleeding of the plasticizer was observed. It is our theory, though we do not wish to be bound thereby, that this is due to the greater solubility of the plasticizer in the copolymer than in the polyvinyl chloride.

The above experiment was repeated, with the omission of the chlorinated rubber cement between the polyvinyl chloride and the copolymer. Excellent adhesion was obtained. Equivalent results are also obtained when iron, brass, zinc, or other metals are employed instead of the aluminum.

When the experiment was repeated with the substitution of an 18% benzene solution of the copolymer for the tackified copolymer interlayer, another article exhibiting very good adhesion was obtained.

Although we have herein disclosed specific embodiments of our invention, we do not intend to limit the invention solely thereto, for it will be obvious to those skilled in the art that many variations and modifications are within the spirit and scope of the invention as defined in the appended claims.

We claim:

1. A composite structure comprising successive layers of a rigid base, halogenated rubber, a vulcanized copolymer of butadiene and an unsaturated nitrile having the structural formula

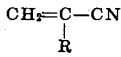

wherein R represents a member of the class consisting of hydrogen and alkyl groups, and a plasticized polyvinyl halide in direct contact with the copolymer, all of which have been bonded into an integral whole by vulcanizing said copolymer layer after assembling the composite.

2. A composite structure comprising successive layers of a rigid base, halogenated rubber, a vulcanized copolymer of butadiene and acrylic nitrile, and a plasticized polyvinyl halide in direct contact with the copolymer, all of which have been bonded into an integral whole by vulcanizing said copolymer layer after assembling the composite.

3. A composite structure comprising successive layers of a rigid base, halogenated rubber, a vulcanized copolymer of approximately 75 parts of butadiene and 25 parts of acrylic nitrile, and a plasticized polyvinyl halide in direct contact with the copolymer all of which have been bonded into an integral whole by vulcanizing said copolymer layer after assembling the composite.

4. A composite structure comprising successive layers of a metallic base, chlorinated rubber, a vulcanized copolymer of butadiene and acrylic nitrile, and plasticized gamma polyvinyl chloride in direct contact with the copolymer, all of which have been bonded into an integral whole by vulcanizing said copolymer layer after assembling the composite.

5. The method which comprises interposing a layer of a vulcanizable composition comprising a copolymer of butadiene and an unsaturated nitrile having the structural formula

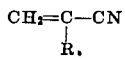

wherein R represents a member of the class consisting of hydrogen and alkyl groups between a plasticized polyvinyl halide and an adjacent layer of halogenated rubber contiguous to a rigid base, with the copolymer in direct contact with the polyvinyl halide, and subjecting the composite article under pressure to heat sufficient to vulcanize the copolymer.

6. The method which comprises interposing a layer of vulcanizable composition comprising a copolymer of butadiene and acrylic nitrile between a plasticized polyvinyl halide and an adjacent layer of halogenated rubber contiguous to a rigid base, with the copolymer in direct contact with the polyvinyl halide, and subjecting the composite article under pressure to heat sufficient to vulcanize the copolymer.

7. The method which comprises interposing a layer of vulcanizable composition comprising a copolymer of butadiene and acrylic nitrile between plasticized gamma polyvinyl chloride and an adjacent layer of chlorinated rubber contiguous to a metallic base, with the copolymer in direct contact with the polyvinyl halide, and subjecting the composite article under pressure to heat sufficient to vulcanize the copolymer.

BENJAMIN S. GARVEY.
DONALD E. HENDERSON.